(No Model.)
H. D. SPANGLER.
COTTON SEED PLANTER.
No. 354,944. Patented Dec. 28, 1886.
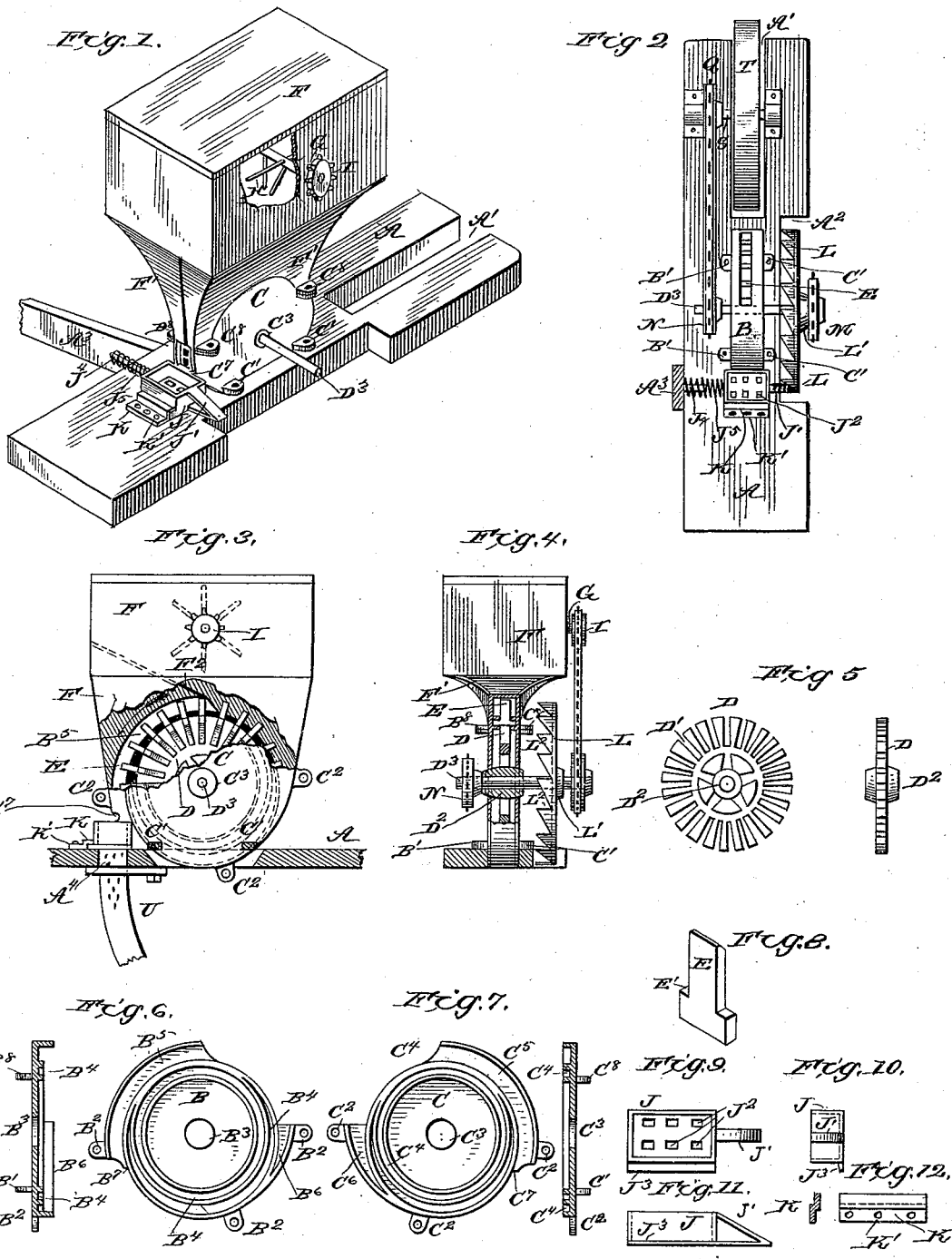
Witnesses
J. W. Fowler
Jos. A. Ryan
Inventor
Harry D. Spangler
By his Attorney
Thomas P. Kinsey

UNITED STATES PATENT OFFICE.

HARRY D. SPANGLER, OF EPHRATA, PENNSYLVANIA, ASSIGNOR OF ONE-HALF TO JACOB S. SPANGLER, OF SAME PLACE.

COTTON-SEED PLANTER.

SPECIFICATION forming part of Letters Patent No. 354,944, dated December 28, 1886.

Application filed November 10, 1886. Serial No. 218,449. (No model.)

*To all whom it may concern:*

Be it known that I, HARRY D. SPANGLER, a citizen of the United States, residing at Ephrata, county of Lancaster, State of Pennsylvania, have invented a new and useful Improvement in Cotton-Seed Planters, of which the following is a specification.

This invention relates to planters provided with a forced feed for cotton seed and such other planting material as is liable to pack and adhere to the seed-propelling parts of the seeding mechanism.

The object of the improvement is to furnish a planter, readily adjustable, to plant especially cotton-seed, or other lint-covered seeds, in either a continuous or interspaced row, as desired.

My improvement will be readily understood from the following description, taken in connection with the accompanying drawings, like letters of reference in which refer to similar parts.

Figure 1 is a perspective view of the seed-box and seeding mechanism of my improved planter, shown in connection with an ordinary frame-piece of a one-horse planter, part of the machinery removed to show more clearly the arrangement of the remaining portion of the same; Fig. 2, a plan of the same with the seed-box removed; Fig. 3, a partial side elevation with part of the seed-box removed, to show the operation of the seed-wheel forced feed; Fig. 4, a partial vertical section of the same; Fig. 5, a front and side elevation of the force-feed seed-propelling wheel; Fig. 6, an interior view and section of the seed-propelling-wheel case, with its concentric feed-guides eccentric to the case; Fig. 7, the cap of the wheel-case, with corresponding concentric guides eccentric to the same; Fig. 8, a perspective view of one of the radial force-feed seed-propeller teeth; Fig. 9, a plan of the shaking seed distributer or separator cup; Fig. 10, an end elevation of the same; Fig. 11, a side elevation showing the projected arm, whereby the shake is given to the separator by intermittent contact with the ratchet-serrated edge of the knocker-wheel; Fig. 12, a side elevation and plan of the guide for the foot-ledge of the shaking seed-separator cup, in all of which—

A represents the bed of a planter; A′, a bifurcated cut for the traction-wheel; $A^2$, a cut-out for the passage of the knocker-wheel; $A^3$, a portion of one of the guiding handles. B represents the seed-wheel case, having ears B′, for securing it to the bed; ears $B^2$, for securing the cap; an aperture, $B^3$, to receive the hub of the seed-wheel; concentric guide-ledges $B^4$, placed eccentric to the case; a feeding-chute, $B^5$, wherein the seed is carried down from the hopper to the separator seed-cup; $B^6$, return-guide to the hopper; a ledge, $B^7$, to prevent rise of separator seed cup, and ears $B^8$, for securing hopper to seed-wheel case. C is the cap to the seed-wheel case, having feeding-chute $C^5$, concentric guide-ledges $C^4$, aperture for wheel-hub $C^3$, retaining-ledge $C^7$, and securing-ears C′, $C^2$, and $C^8$.

The hopper F is supported upon ears $B^8$ $C^8$ of the wheel-case, is provided with a narrowed portion, F′, cast in two parts, with a chute or cut-off, $F^2$, and to prevent packing of the seed behind the wheel-case, a shaft, G, passes transversely across the upper portion of the hopper F, which is provided with stirring-arms H, and has a sprocket-wheel, I, secured to its outer end, and is revolved by sprocket-link connection with a sprocket-wheel, M, upon the propelling seed-wheel shaft. This prevents the arching or packing of the seed in the hopper.

Experts in cotton-seed planting are aware of the necessity of having a forced feed, so as to deliver the seed with uniformity, and that it is desirable to have the means, when starting in with the planting, to deliver the seed in either a continuous stream or at regular intervals as the planter passes over the field. Although a forced feed is not new, yet in itself it fails to meet the wants of the planter, as it is found practically that linty seeds, particularly those of a gummy nature, as cotton-seed, will adhere with more or less tenacity, and that the seed will be delivered in mass, or bunches, which makes it difficult to withdraw, in thinning out the rows, the superfluous young plants, without injury to the roots of the plants it is desirable to have remain for cultivation.

In my improvement the above objectionable features are removed and entire control given to the operator of the quantity and manner in which the seeds shall be distributed in the rows. To insure the delivery of the seeds from the hopper, a propelling seed-wheel, D, having a series of parallel radial cuts, D', in its periphery, of a depth to allow full play to the movement of the seed-forcing teeth E, provided with a hub, $D^2$, and securely mounted upon a shaft, $D^3$, is placed within the case B, and held therein by the cap C, its hub $D^2$ resting in the perforations $B^3 C^3$, and revolving in the same, concentric with the guides $B^4 C^4$ in said case and cap. A sprocket-wheel, N, and link-connection with the traction-wheel shaft S, by sprocket wheel Q, serves to give motion to the seed-propelling wheel, or a series of gear-wheels may be introduced in lieu of the sprocket-link connection to attain the same result. After placing the propelling-wheel D in its case B, the seed-forcing teeth E are dropped within the respective peripheral cuts D', with their wings E' lying between the concentric ledges or guides $B^4$. The cap C is then placed over the same and bolted together by the ears $B^2 C^2$, and the case is then secured to the frame by the ears $B^8 C^8$. Motion being now given to the propelling-wheel D, the teeth E will be carried around in the case, and the wings E' being guided by the concentric guides the teeth will be protruded from the face of the case as they successively rise within the hopper F, attaining their full projection just before passing downward within the covered chute $B^5$, where they are gradually retracted within the periphery of the case, as they are retracted stripping off the seeds held by the same, and dropping them into the seed-cup placed to receive the same. The seed-cup J, as shown, is secured in sliding contact with the frame A by a ledge, $J^3$, on the rear base of the same, and a guide, K, overlapping said ledge and secured by screws, K'. The seed-cup is held from rising at the forward side by offsets $B^7 C^7$ upon case and cap of the propelling-wheel. The bottom of the cup is perforated, preferably, with six holes, $J^2$, of about one-half inch square each, is provided with a knocker-arm, J', which is constantly pressed toward the knocker-wheel L by a spiral or equivalent spring, $J^5$, held in contact with the cup by a stud, $J^4$, driven into the handle of the planter, and which is of such length as to permit the free movement of the cup to the extent desired.

The knocker-wheel L is a disk having a hub, L', by which it is suitably secured upon the seed-propelling-wheel shaft $D^3$, and has a series of teeth, $L^2$, of ratchet form at right angles with the disk-face, projected toward the knocker-arm J' of the cup J, with which the teeth contact as the wheel is revolved, thus causing a gradually-accelerated movement of the cup away from the wheel and a quick sudden return of the same as the arm moves over the ratchet-teeth and falls between the same.

The parts as described and shown may be cast of any suitable metal, very little fitting being necessary, the parts being so arranged relative to each other as after cleaning to drop within each other with a suitable amount of play to insure smooth working.

To plant the seed in a continuous row all the seed-forcing teeth E are placed in the wheel D, and the sprockets or other gears so arranged that the wheel D shall travel in a proper ratio to that of the traction-wheel T, and to plant at regular intervals in the rows as passing over the field, one, two, or more of the said forcing-teeth are withdrawn from the case, leaving a series of spaces and of teeth at regular intervals in the cuts D' of the wheel. Then upon revolving the wheel the seed will only be gathered and forced out of the hopper as the teeth at regular intervals pass within the chute $B^5$.

The operation of the planter as a whole is as follows: The hopper F is filled with the seed to be planted and the machine is started. The seed-wheel, by the direct or indirect connection of its shaft with that of the traction-wheel, immediately begins to revolve, and through the connection of the seed-wheel shaft with that of the stirrer-shaft in the hopper a simultaneous movement of the stirrer or agitator occurs. The result is that the seed is kept in a continual state of agitation and drops upon the teeth E, projected through the case B, and is caught and carried by the same into the chute $B^5$, where the teeth are retracted and the seed drops by gravity within the seed-separator cup J, the sudden jerking movement of which, through the combined action of the knocker-wheel L, teeth $L^2$, and spring $J^5$, separates the seeds from each other and passes them through the perforations $J^2$ in the bottom of the same. A perforation, $A^4$, in the frame permits the seed to drop in the furrow produced by the shovel or hoe U.

Having shown the advantages of my improvement, its construction and use, I desire to claim as follows:

1. As an improvement in seed-planters provided with a force-feed in which arms are projected and withdrawn eccentrically within the rim of the feed-wheel, the case B, constructed as shown and described, having upon its interior face eccentric to the case concentric ledges adapted to receive and guide the wings E' of loose teeth E, and closed by a cap, C, provided with corresponding ledges for the same purpose, a seed-propelling wheel inclosed within the case, having peripheral cuts within which the body of the said teeth lie, mounted upon a shaft with its hubs supported and revolving in said case and cap, in combination with a hopper and its stirrer, the traction-wheel T, and planter-frame A, as and for the purpose set forth.

2. As an improvement in cotton-seed and analogous seed planters, a distributer or seed-separator cup receiving the seed from the force-feed by gravity, said cup held in place at its front top edge by projected portions of the case and cap of the feed-wheel and at its rear by a base-ledge, with guide overlapping the same, an arm projected toward the knocker-wheel, and the bottom of the cup perforated with six or more square holes, in combination with the planter-frame, force-feed wheel, and knocker-wheel upon the shaft of the same, suitably connected with the traction-wheel shaft, whereby on revolution a sharp and effective jerk is given to said cup, separating the seeds from each other, and passing the same through the cup to the furrow below, a spring, J⁵, and stud J⁴, for the retention of the same, adding force to the action of the cup, as and for the purpose set forth.

3. As an improvement in seed-planters, a force-feed seed-disk wheel having peripheral parallel cuts within the body of the same, its hub projecting equally from both sides of the disk and adapted to revolve upon the same within bearings in the case and cup, said bearings being eccentric to the case, said cup and case provided with ledges concentric with said bearings, teeth E, having wings E′, the latter traveling freely within said concentric ledges, and the body E, free to move in the peripheral cuts D′ of the wheel, whereby, upon revolution of the same, the said teeth are projected from and retracted within the periphery of the case at suitable points to catch and force out of the hopper the seed, and in the chute release themselves therefrom, and, by the removal or non-removal of said teeth at intervals from said wheel, as described, to drop the seed in alternate hills, or in a continuous stream, as desired, substantially as and for the purpose set forth.

4. As an improvement in cotton-seed planters, the combination, essentially, of the following elements: a frame, A, traction-wheel T, shaft S, sprocket or gear Q, force-feed-wheel case B, and cap C, secured to said frame, and inclosing a revolving feed-wheel, D, with loose teeth E, moving freely in peripheral cuts in said wheels, the wings E′ of said teeth guided between concentric ledges B⁴ C⁴, within the cap and case and eccentric to the same, said teeth being projected and retracted, as described, a hopper, F, secured by a divided portion, F′, to said case, a shaft, D³, in said feed-wheel, having sprockets M and N, and knocker-wheel L, secured to the same, in link-connection with sprocket Q on traction-shaft, and with hopper-stirrer sprocket I, a seed separator and distributer cup, J, having a reciprocating transverse movement upon the frame, retaining lug and guide on the frame, a knocker-arm, J′, spring J⁵, stud J⁴, and offsets B⁷ C⁷, to prevent rise of the cup, the whole arranged, combined, and adapted to be operated as and for the purpose set forth.

HARRY D. SPANGLER.

Witnesses:
F. W. HULL,
D. K. KRAATZ.